Nov. 12, 1946.  E. H. HILL  2,411,133
ROLLER CONVEYER FOR VEHICLE BODIES
Filed Sept. 20, 1945  2 Sheets-Sheet 1
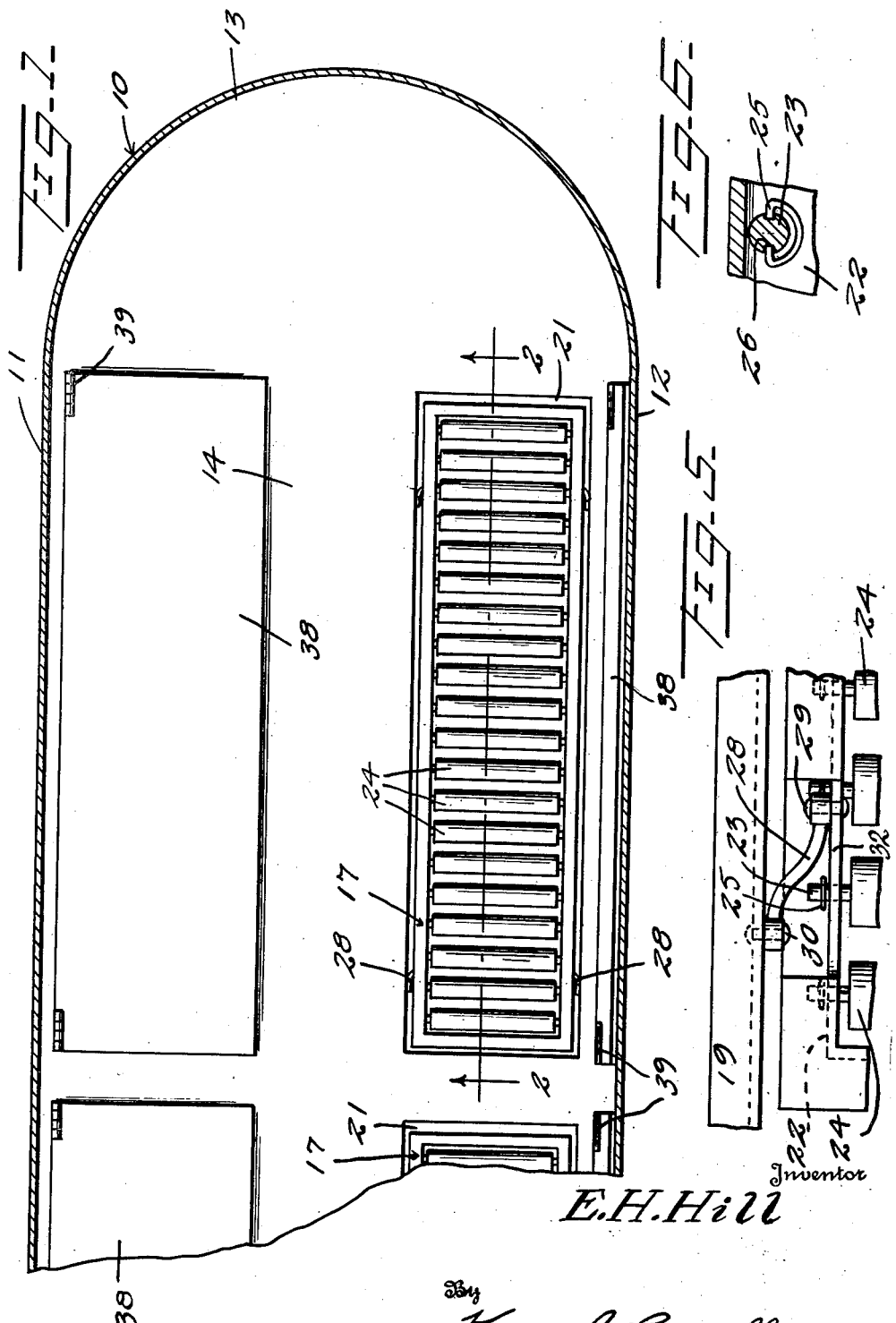

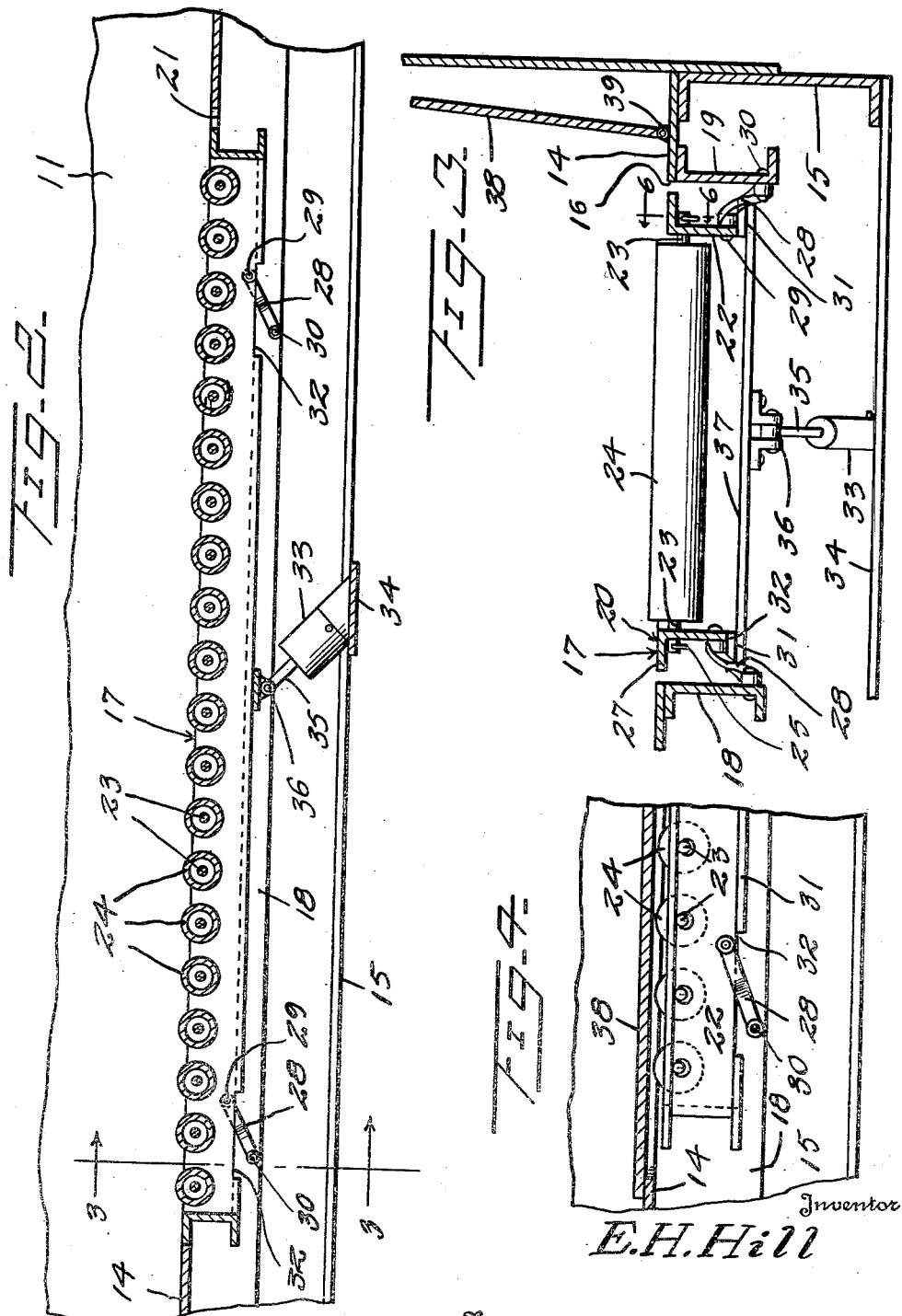

Patented Nov. 12, 1946

2,411,133

UNITED STATES PATENT OFFICE 2,411,133

ROLLER CONVEYER FOR VEHICLE BODIES

Edward H. Hill, San Antonio, Tex.

Application September 20, 1945, Serial No. 617,534

1 Claim. (Cl. 214—84)

This invention relates to freight handling devices and more particularly to a means for facilitating the placement or removal of heavy articles in a freight truck or trailer body.

An object of this invention is to provide an improved conveyer which is mounted in the floor of a truck or trailer body, and which is devised to facilitate the positioning of heavy articles of freight within the truck or trailer body, and to facilitate the removal of the articles from the vehicle.

Another object of this invention is to provide a conveyer of this kind which is retractible so that when small articles are being conveyed ordinary hand trucks may be used to position the articles within or to remove the articles from the vehicle body.

Further object of this invention is to provide in combination with a vehicle body, such as a truck or trailer, a plurality of roller conveyers and hydraulic means for raising or lowering the conveyers to either an operative or an inoperative position.

A further object of this invention is to provide a plurality of conveyers of this type in a vehicle body which may be either individually operated or may be operated as a unit.

With the foregoing objects in view, and others which may hereinafter more fully appear the invention consists of the novel construction, combination and arrangement of parts, as will be more specifically described, and illustrated in the accompanying drawings, wherein are shown embodiments of the invention, but it is to be understood that changes, variations and modifications may be resorted to which fall within the scope of the invention, as claimed.

In the drawings:

Figure 1 is a horizontal section of a vehicle body having a roller conveyer assembly mounted therein according to this invention.

Figure 2 is a fragmentary longitudinal section taken on the line 2—2 of Figure 1.

Figure 3 is a fragmentary vertical section taken on the line 3—3 of Figure 1.

Figure 4 is an enlarged fragmentary sectional view similar to Figure 3.

Figure 5 is a fragmentary bottom plan view of the conveyer.

Figure 6 is a fragmentary sectional view taken on the line 6—6 of Figure 3.

Referring to the drawings the numeral 10 designates generally a vehicle body which includes opposite side walls 11 and 12 and a front wall 13. The rear wall (not shown) may have doors or the like swingably secured thereto in order to provide access to the interior of the vehicle body. The vehicle body also includes a floor 14 which is secured at its outer marginal portions to body supporting beams 15, which are of channel shape with the channel thereof facing inwardly. The floor 14 is provided with a plurality of rectangular openings 16 within each of which a roller conveyer frame structure generally designated as 17 is adapted to loosely engage.

The floor 14 along the lengthwise edges of the opening 16 has secured to the lower side thereof a pair of channel members 18 and 19, which face oppositely from each other with the channels outermost. The frame structure 17 includes a pair of side channel members 20 and a pair of end channel members 21. The channels of the side and end members 20 and 21 face outwardly, as shown more clearly in Figure 3. The channel members 20 have rotatably mounted in the vertical webs 22 thereof a plurality of parallel spaced apart roller shafts 23. A roller 24 is rotatably carried by each shaft 23 and is positioned between the webs 22 of the side frame members. The shafts 23, as shown in Figure 6, are locked against endwise movement by means of substantially C-shaped locking members 25 which have the confronting ends thereof loosely engaging in recesses 26 formed in the shaft 23. The shafts 23 are disposed closely adjacent the upper flange 27 of each side member 20 so that each roller will partially project above the top of the frame structure 17. The frame structure 17 has secured to the opposite sides thereof pairs of links 28 which are pivotally secured at one end thereof to the webs 22 by pivot members 29. The opposite ends of the links 28 are pivotally secured, as at 30, to the webs of channel members 18 and 19. The lower flanges 31 of the channel members 20 are formed with elongated slots 32 within which the links 28 are loosely disposed.

In order to provide for the extension or retraction of the conveyer assembly, I have provided a hydraulic operator 33 which is mounted on a transversely extending bar 34 extending between the beams or channel members 15. The hydraulic member 33 is adapted to be connected to a source of fluid pressure and the piston rod 35 of the hydraulic member 33 is rockably connected to a bearing member 36, which is secured to a transversely disposed bar 37 secured to the lower flanges 31 of the channel members 20. As shown in Figure 4 the opening 16 is substantially longer than the length of the conveyer structure 17 so that the conveyer structure may freely be swung upwardly on the links 28 from a retracted to an extended position with the rollers engaging slightly above the surface of the floor 14. When the conveyer members are in a retracted position the opening 16 may be closed by means of a closure plate 38, which is pivotally carried, as at 39, by the floor 14 adjacent each conveyer assembly, with the plate 38 slightly larger than the opening 16 in order that the closure plate 38 will completely cover each opening 16.

In the use of this conveyer where a number of large heavy articles are to be loaded into the vehicle body 10, the first one of these articles may be placed on the rear conveyer 17. This conveyer will be raised by its associated hydraulic elevator 33, and the succeeding conveyer units 17 may also be raised to their operative positions, the closure 38 being first raised to its open position.

In certain instances, the first article may be placed on the rear conveyer and then additional articles may abut against the preceding article, and the two articles then moved inwardly and this procedure repeated until a line of these articles is formed from the rear to the front of the vehicle.

With lighter weight articles, which are readily handled by hand trucks, and which are to be loaded into the vehicle, the conveyer units may be left in their retracted positions and the closures 38 left in their closed position. The smaller articles may then be placed on top of the closures.

It will be apparent that if only one or two heavy articles are to be placed in the vehicle, such articles may initially be engaged with the extended conveyers and placed in their proper position within the vehicle body whereupon any unused conveyers may then be lowered and the associated closures swung to closed position.

This conveyer construction will facilitate the handling of heavy articles, and provide for a considerable reduction of time in the handling thereof, in addition to a reduction in the number of men needed for loading and unloading such heavy articles.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What I claim is:

In a device as described a frame, a fixed rail below the frame side members supported in spaced apart parallel relation above said rail adjacent to the sides of the frame, a pair of link arms arranged at each end of the frame, straddling the sides thereof, being pivotally secured at their upper ends to said frame sides and at their lower ends being pivotally secured to said side members, said pairs of links projecting in the same direction diagonally of said side members, a hydraulically activated cylinder having a base secured rigidly upon said sill, on each side of the frame, disposed at an inclination counter to the inclination of said links, but also diagonally to said side members, and plungers in said cylinders carved by pistons in the latter extending out of said cylinders also diagonally with relation to the side members and having their outer ends pivotally secured to the bottom part of the frame between its ends in such a manner that the frame exerts a vertical thrust down upon the plungers laterally of the adjacent ends of the cylinders effective to bind the peripheral portion of the pistons against the inner circumference of the cylinders to prevent the pistons moving down in said cylinders, and to hold the frame in movably supported relation to said cylinders with the ends of the frame supported against sagging by said links.

EDWARD H. HILL.